(12) United States Patent
Bauer et al.

(10) Patent No.: US 11,370,278 B2
(45) Date of Patent: Jun. 28, 2022

(54) MOTOR VEHICLE

(71) Applicant: Bayerische Motoren Werke Aktiengesellschaft, Munich (DE)

(72) Inventors: Frank Bauer, Munich (DE); Jeannette Kerkhoff, Munich (DE); Carsten Lange, Haimhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 58 days.

(21) Appl. No.: 16/770,344

(22) PCT Filed: Dec. 6, 2018

(86) PCT No.: PCT/EP2018/083800
§ 371 (c)(1),
(2) Date: Jun. 5, 2020

(87) PCT Pub. No.: WO2019/110732
PCT Pub. Date: Jun. 13, 2019

(65) Prior Publication Data
US 2020/0376938 A1 Dec. 3, 2020

(30) Foreign Application Priority Data
Dec. 8, 2017 (DE) ...................... 10 2017 222 274.3

(51) Int. Cl.
B60J 5/04 (2006.01)

(52) U.S. Cl.
CPC ........... B60J 5/0451 (2013.01); B60J 5/0413 (2013.01); *B60J 5/0415* (2013.01); *B60J 5/0429* (2013.01); *B60J 5/0443* (2013.01); *B60J 5/0468* (2013.01)

(58) Field of Classification Search
CPC ...... B60J 5/0413; B60J 5/0451; B60J 5/0455; B60J 5/042
USPC ..................... 296/146.6, FOR. 112
See application file for complete search history.

(56) References Cited

U.S. PATENT DOCUMENTS

| 8,733,819 B1 | 5/2014 | Le et al. | |
| 9,796,425 B2* | 10/2017 | Tanaka | B60J 5/0429 |
| 2007/0145770 A1* | 6/2007 | Katou | B60J 5/0425 |
| | | | 296/146.6 |

(Continued)

FOREIGN PATENT DOCUMENTS

| DE | 10 2010 014 510 A1 | 10/2011 |
| DE | 10 2013 021 239 A1 | 7/2014 |

(Continued)

OTHER PUBLICATIONS

International Search Report (PCT/ISA/210) issued in PCT Application No. PCT/EP2018/083800 dated Mar. 8, 2019 with English translation (five (5) pages).

(Continued)

*Primary Examiner* — Jason S Morrow
*Assistant Examiner* — Wenwei Zhuo
(74) *Attorney, Agent, or Firm* — Crowell & Moring LLP (57) ABSTRACT

A motor vehicle with at least one vehicle door includes a reinforcement component arranged in the lower section of the door body of the vehicle door. The reinforcement component is an open profile with lateral walls and an M-profile formed thereon which extend in the vehicle transverse direction in order to absorb forces acting in the vehicle transverse direction in the event of a load.

14 Claims, 5 Drawing Sheets

(56) References Cited

U.S. PATENT DOCUMENTS

2009/0026795 A1\* 1/2009 Tate ................. B60J 5/0429
  296/146.6
2013/0057018 A1   3/2013 Reese
2014/0035322 A1   2/2014 Sakhara et al.
2017/0326954 A1\* 11/2017 Peidro Aparici ...... B60J 5/0451

FOREIGN PATENT DOCUMENTS

WO    WO 02/092393 A1    11/2002
WO    WO 2016/083510 A1   6/2016

OTHER PUBLICATIONS

German-language Written Opinion (PCT/ISA/237) issued in PCT Application No. PCT/EP2018/083800 dated Mar. 8, 2019 (five (5) pages).

German-language Search Report issued in German Application No. 10 2017 222 274.3 dated Jul. 12, 2018 with partial English translation (14 pages).

\* cited by examiner

MOTOR VEHICLE

BACKGROUND AND SUMMARY OF THE INVENTION

The invention relates to a motor vehicle having a vehicle door.

From WO 2016/083510 A1, a vehicle door of a motor vehicle is already known that has a door body with an outer door skin and an inner door panel. In a cavity between the outer door skin and the inner door panel, a U-shaped, crash-absorbing reinforcing element is arranged in a lower portion of the vehicle door.

The reinforcing element is located approximately in the middle of the lower portion of the vehicle door. The reinforcing element is made of metal. The reinforcing element has a full-surface wall which points toward the outer door skin. Two side walls which extend in the transverse direction of the vehicle adjoin the full-surface wall.

The two side walls of the reinforcing element have been connected to one another by a fastening flange. The fastening flange points with its fastening face in the transverse direction of the vehicle toward the inner door panel to which the fastening flange has been fastened.

In the embodiment shown, the fastening flange has a rectangular, closed contour. Viewed in the longitudinal direction of the vehicle, the fastening flange is very largely V-shaped. In comparison with the closed wall of the reinforcing element, the reinforcing element has been designed to be open between the ends of the side walls.

By virtue of the reinforcing element, the absorption of energy in the so-called "side pole test" and in the so-called "FMVSS214S test" is increased considerably. At the same time, by virtue of the reinforcing element it is ensured that the depth of penetration or intrusion into the vehicle door is reduced at the same time.

The object of the invention is to provide a motor vehicle with at least one vehicle door, wherein a reinforcing component is arranged in a lower portion of a door body of the vehicle door.

A motor vehicle according to the invention includes a body shell which surrounds a passenger compartment of the vehicle. A vehicle door which is capable of swiveling has been arranged in each instance in the body shell in existing door apertures. The respective vehicle door has a door body. In a lower portion of the door body a crash-absorbing reinforcing element has been arranged on an inner door panel between an outer door skin and the inner door panel.

Advantageously, the reinforcing component is an open profile, the side walls of which, and an M-profile formed thereon, extend in the transverse direction y of the vehicle for the purpose of absorbing forces acting in the transverse direction y of the vehicle in a loading case.

In an advantageous embodiment, the fastening of the reinforcing component is effected via respectively opposing flanges which have respectively been formed at a lower end of the respective side wall, angled relative to the side walls.

A further fastening of the reinforcing component is advantageously effected on the inner door panel via two tabs.

In an advantageous embodiment, the opposing tabs have respectively been integrally formed on the respective side wall, angled in the transverse direction y of the vehicle.

The M-profile is advantageously constituted by, in each instance, an upper portion of the respective side wall and an adjoining V-shaped profile.

In an advantageous embodiment, the respective upper portion of the respective side wall is adjoined in each instance by a horizontal portion on which the V-shaped profile has been integrally formed.

The V-shaped profile advantageously has two side walls extending obliquely toward one another, which have been connected to one another at their opposing lower ends. In another advantageous embodiment, a horizontal portion has been integrally formed between the opposing lower ends of the side walls.

Between the upper portion of the respective side wall a longitudinal edge has advantageously been formed in each instance. The respective longitudinal edge has at least one passage opening.

In an advantageous embodiment, a longitudinal edge, which in each instance has at least one passage opening, has been formed at a respective lower end of the respective side wall and on the respective flange angled relative thereto.

A recess has advantageously been formed between the respective side wall and the respective tab opposite thereto.

In an advantageous embodiment, the respective tab has been provided in each instance with a passage opening.

On an end face of the M-profile, a tab has advantageously been formed in each instance, the surface of which points in the direction of an inner surface of the outer door skin.

In an advantageous embodiment, a side-impact beam has been attached by its opposing ends to the inner door panel.

Advantageously, the side-impact beam extends obliquely upward in the vertical direction z from a rear, lower corner of the inner door panel and forward in the direction of a front end of the motor vehicle—that is to say, in the longitudinal direction x of the vehicle—as far as a vertical portion of the inner door panel.

An embodiment of the invention will be described below by way of example with reference to the drawings.

DETAILED DESCRIPTION OF THE DRAWINGS

Figure 1:
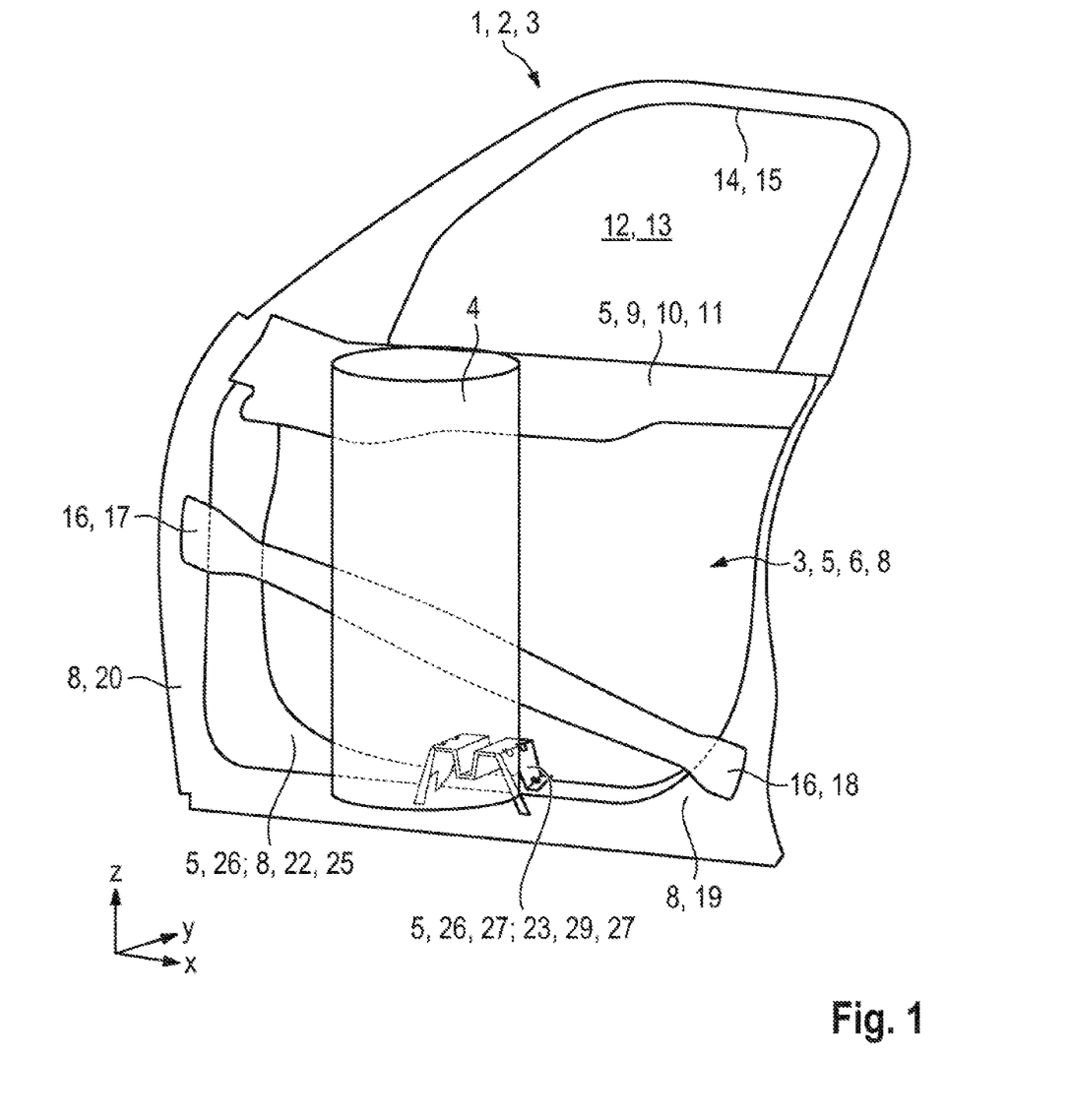
FIG. 1 is a perspective view of a vehicle door in which an outer door skin has been omitted, wherein a traversable barrel or barrier for a crash test has additionally been represented.

FIG. 1 shows a vehicle door 3 of a motor vehicle 1 which is not represented in any further detail, the vehicle door 3 being part of a body shell 2. A longitudinal axis of the vehicle extends in the longitudinal direction x of the vehicle from a front end of the motor vehicle as far as a rear end of the vehicle.

The body shell 2 forms, in a known manner, a passenger cell with a passenger compartment 74. In front of the vehicle door 3, a barrel-shaped barrier 4 has been represented which stands symbolically for a crash test.

The vehicle door 3 exhibits a door body 5 with a cavity 6. The door body 5 is constituted by an outer door skin 7 shown in FIG. 4 and an inner door panel 8 connected to the outer skin. A passage opening 10 for a window channel 11 has been formed on an upper portion 9 of the door body 5.

In the embodiment shown, a window frame 15 adjoins the upper portion 9 of the door body 5. In a passage opening or window opening 14 of the window frame 15 there is located, in an upper position 13, a window 12 which closes the window opening 14 of the window frame 15.

The window 12 is capable of being displaced through the window channel 11 from a lower position in the cavity 6 outward into the upper position 13. The window 12 is reversibly displaceable between the cavity 6 and the window frame 15.

A side-impact beam 16 has furthermore been fastened by its opposing ends 17 and 18 to the inner door panel 8. The upper end 17 of the side-impact beam 16 has been arranged on a front—viewed in the longitudinal direction x of the vehicle—vertical portion 20 of the inner door panel 8. The lower end 18 of the side-impact beam 16 has been fastened to a rear, lower corner 19 of the inner door panel 8.

In the embodiment shown, the side-impact beam 16 extends from a rear lower corner 19 of the inner door panel 8 obliquely upward in the vertical direction z and forward in the longitudinal direction x of the vehicle as far as the vertical portion 20 of the inner door panel 8.

In one embodiment, the barrel-shaped barrier 4 serves to carry out a statutory door-pressure test. For instance, the barrel-shaped barrier 4 is displaced by a predetermined distance y in the transverse direction y of the vehicle after abutment against an outer surface 21 of the outer door skin 7 or of the vehicle door 3. The distance y amounts to, for instance, y=6 inches.

Figure 4:
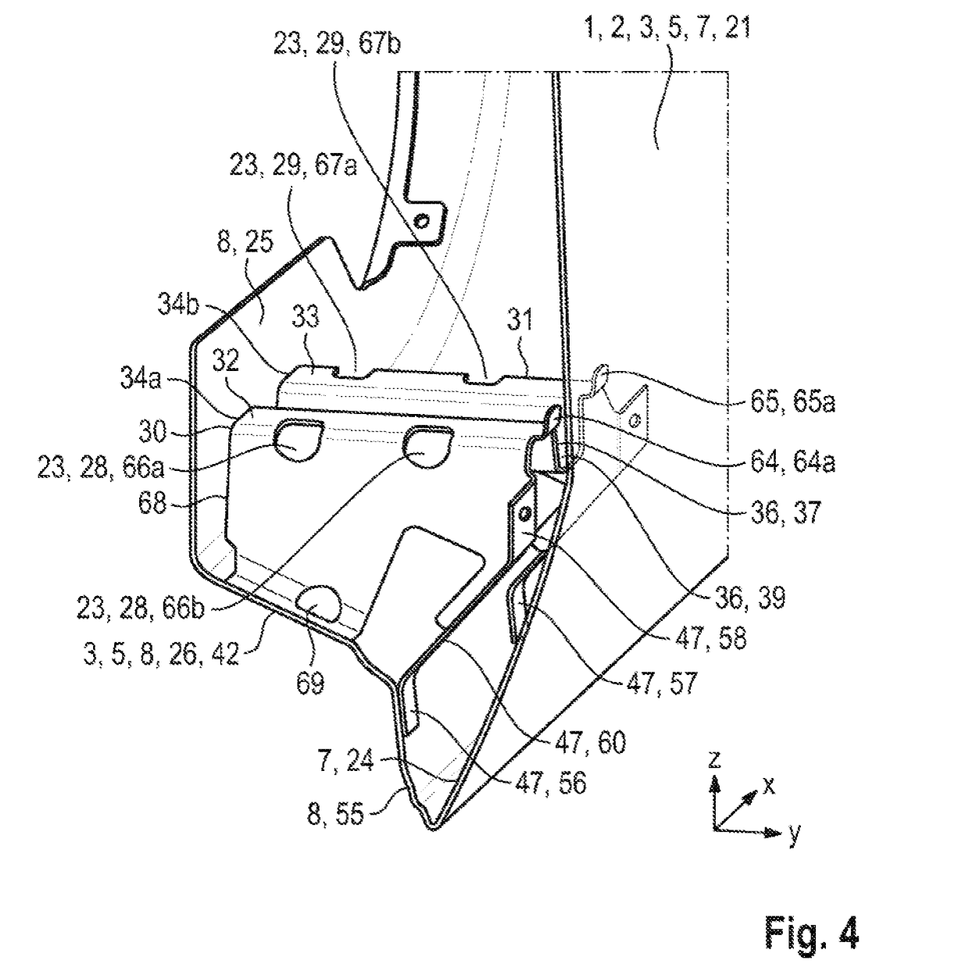
FIG. 4 is a perspective cross-sectional view of a lower portion of the vehicle door, in which a reinforcing component has been arranged between an outer door skin and an inner door panel.

In the course of the displacement of the barrel-shaped barrier 4 by the predetermined distance, the force that is required for displacing the barrel-shaped barrier 4 is measured. For the purpose of attaining the requisite deformation energy $E_d$=force F×distance y, which results from the aforementioned product, a force-transmitting or load-transmitting reinforcing component 23 has been arranged on a lower portion 22 of the inner door panel 8 between an inner surface 24 of the outer door skin 7 and an inner surface 25 of the inner door panel 8.

The reinforcing component 23 keeps a predetermined safety spacing a between the inner surface 24 of the outer door skin 8 and the inner surface 25 of the inner door panel 8 constant over a predetermined period of time in the event of an application of force, for example when the barrel-shaped barrier 4 is being displaced onto the door body 5 of the vehicle door 3.

The reinforcing component 23 generates an additional load path between the outer door skin 7, the inner door panel 8 and a sill, not represented, of the body shell 2, which has been formed at a lower end of a door aperture.

The reinforcing component 23 serves especially for the degradation of energy in dynamic side-crash load cases, particularly the barrier load cases. Examples of these are ECE-R95 or the "IIHS side-barrier load case". IIHS is the abbreviation for the Insurance Institute for Highway Safety (USA).

Figure 2:
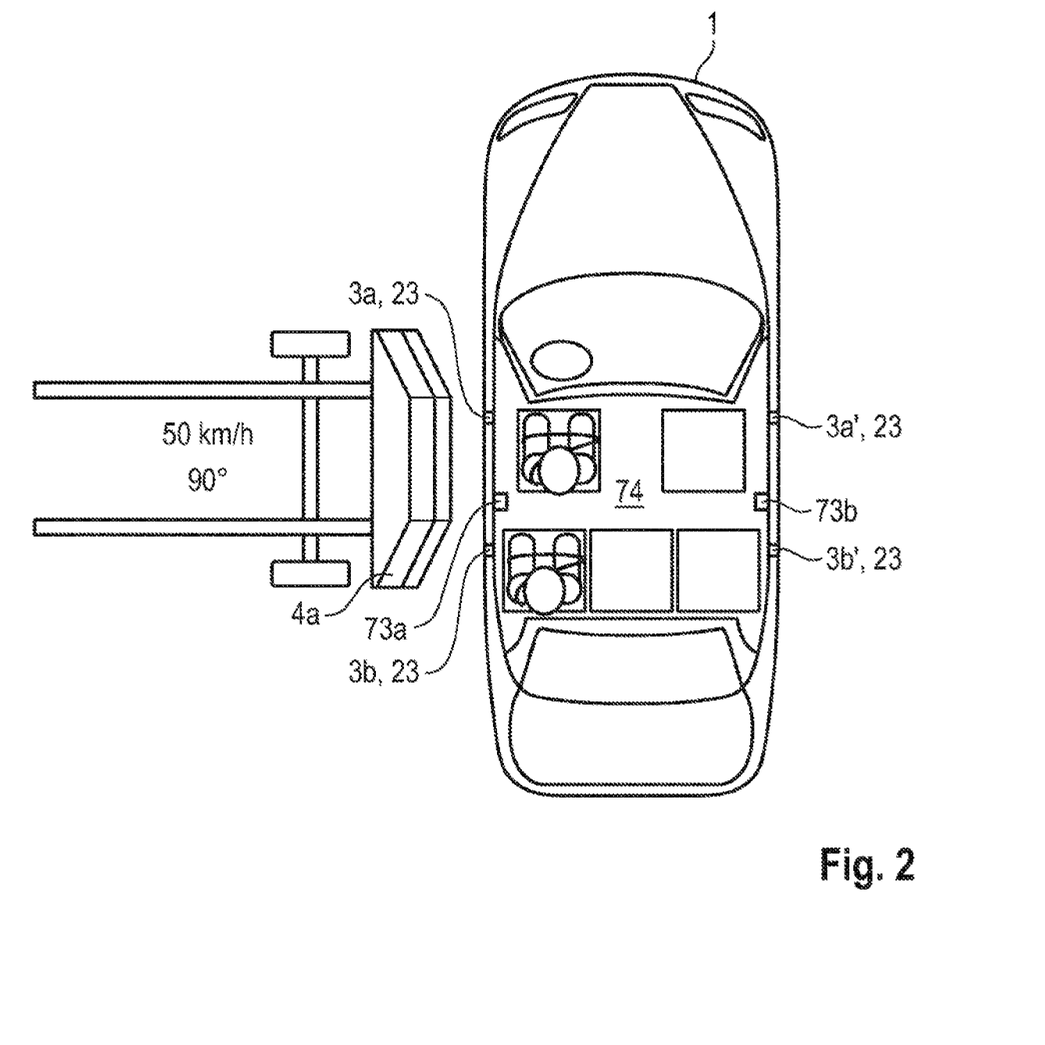
FIG. 2 is a view from above of an "IIHS side-barrier load case", in which a deformable barrier at a speed of 50 km/h and with a weight of 1500 kg is driven laterally onto a stationary vehicle at an angle of 90°.

In the "IIHS side-barrier load case" shown in FIG. 2, a deformable barrier 4a at a speed of 50 km/h and with a weight of 1500 kg is driven laterally onto a stationary motor vehicle 1 at an angle of 90°.

In this test, the intrusion, for instance, of the region of the B-pillar 73a into the passenger compartment 74 is measured. Particularly in the dynamic barrier load cases, the force-transmitting reinforcing component 23 has the property, by virtue of its special geometry, of reducing the overall intrusion of the barrier.

When the barrier strikes the reinforcing component 23, the reinforcing component is subjected both to pressure and to torsion. The design, according to the invention, of the reinforcing component counteracts both the pressure arising in the course of the intrusion and the torsion arising in the course of the intrusion.

Figure 3:
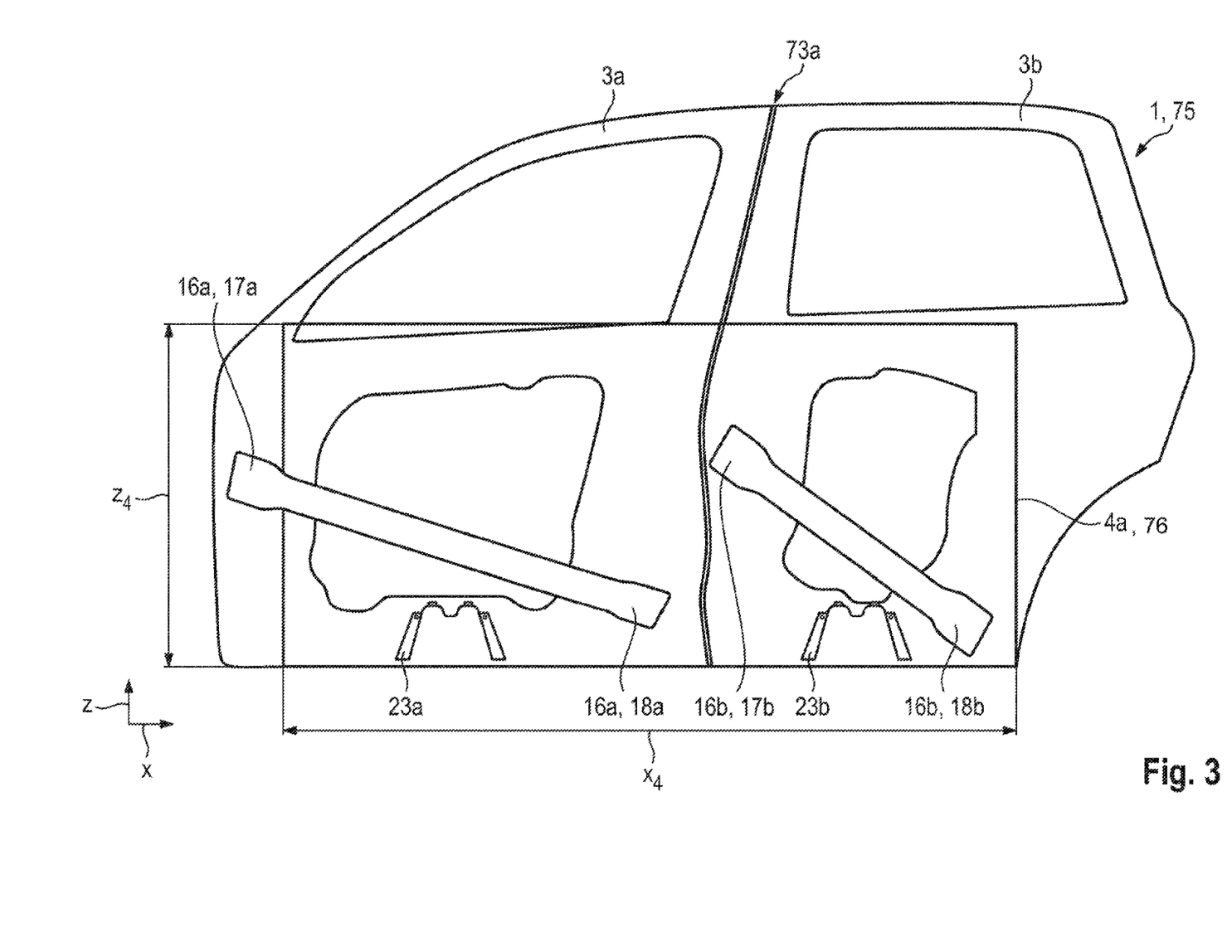
FIG. 3 is a view of a side wall of a motor vehicle from outside, corresponding to FIG. 1, in which an outer door skin of a front door and of a rear door have respectively been omitted.

FIG. 3 shows a view from outside of a side wall 75 of a motor vehicle 1, which is acted upon by a barrier 4a corresponding to FIG. 2. In the embodiment shown, the barrier 4a exhibits a rectangular impact surface 76.

In FIG. 3, the impact surface 76 of the barrier 4a of the IIHS side-barrier load case shown in FIG. 2 has been represented symbolically as a rectangle. The impact surface 76 of the barrier 4a has a predetermined height $z_4$ and a predetermined width $x_4$.

In the case of the side wall 75, an outer door skin 7a of a front vehicle door 3a and of a rear vehicle door 3b have respectively been omitted, in accordance with FIG. 1. A B-pillar 73a has been formed in the body shell 2 between the two vehicle doors 3a and 3b or—to be more exact—between the door apertures provided in the body shell 2.

As is evident from FIG. 3, the positioning of the front reinforcing component 23a in the front vehicle door 3a and the positioning of the rear reinforcing component 23b in the rear vehicle door 3b in the longitudinal direction x of the vehicle ensures, in cooperation with the B-pillar, a partitioning of the load path, distributed over the width $x_4$ of the barrier 4. This results in a higher absorption of energy and hence in a reduced overall intrusion.

It is evident from FIG. 1 that the reinforcing component 23 in the embodiment shown is located approximately in a central region 27 of the lower portion 26 of the door body 5, or of the lower portion 22 of the inner panel 8 of the vehicle door 3 in the longitudinal direction x of the vehicle.

Figure 5:
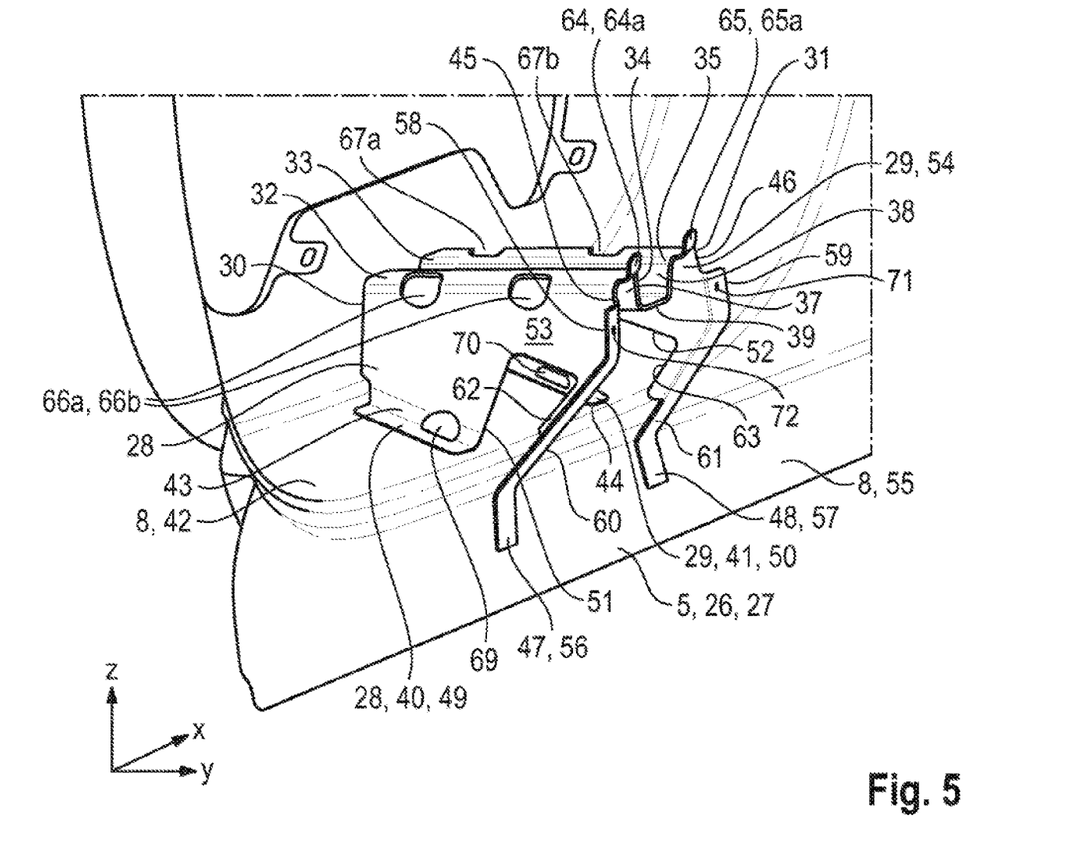
FIG. 5 is a perspective view like FIG. 4 but, in contrast to FIG. 4, without the outer door skin, wherein from FIG. 5, as from FIG. 4, the shape and arrangement of the reinforcing component are evident.

As is evident from FIGS. 1, 4 and 5, viewed in the transverse direction y of the vehicle the reinforcing component 23 has an M-shaped profile 35 which in the following will be called the M-profile 35. In the geometrical design described here, this profile 35 results in an increase in the resistance upon contact with the barrier 4a, and consequently in a rapid rise in load-level with subsequently continuous degradation of energy at a constant level.

The M-shaped geometry of the reinforcing component 23 is constituted by two side walls 28, 29 spaced from one another, the respective upper end of which is adjoined by a longitudinal edge 30, 31 extending in the transverse direction y of the vehicle.

A horizontal portion 32, 33 extending in the transverse direction y of the vehicle has been integrally formed on the respective longitudinal edge 30, 31. The respective horizontal portion 32, 33 is again followed respectively by a longitudinal edge 34a, 34b on which an approximately V-shaped profile 36 has been integrally formed.

The V-shaped profile 36 exhibits two side walls 37 and 38 extending obliquely toward one another, which in the embodiment shown have been connected to one another by a horizontally extending portion 39. In another embodiment, the two side walls 37 and 38 extending obliquely toward one another have been directly connected to one another.

When, for instance, a barrier strikes the door body 5, the reinforcing component 23 is subjected both to pressure in the transverse axis y of the vehicle and to bending about the longitudinal axis of the vehicle. The M-profile 35 of the reinforcing component 23 serves for increasing the resistance or the reinforcement of the cavity 6 between the outer door skin 7 and the inner door panel 8 in the lower region 5a of the door body.

The respective side walls 28, 29 have been fastened to a portion 42, extending approximately horizontally, of the inner door panel 8 via, respectively, a flange 40, 41 extending in the transverse direction y of the vehicle. A longitudinal edge 43, 44 has respectively been provided between the respective lower end of the respective side wall 28, 29 and the flange 40, 41 formed integrally therewith.

A tab 47, 48 has respectively been formed on, respectively, an upper, front end face 45, 46 of the respective side wall 28, 29. In the embodiment shown, a recess 51, 52 has been formed between, respectively, a front end 49, 50 of the flange 40, 41 and the respectively opposing tab 47, 48.

A portion 53, 54, located above the respective recess 51, 52, of the respective side wall 28, 29 projects in each instance in the transverse direction y of the vehicle by a predetermined length beyond a vertical portion 55 of the inner door panel 8.

In the embodiment shown, the respective tab 47, 48 has been connected at its lower end to the vertical portion 55 of the inner door panel 8 via a respectively rectangular portion 56, 57. The respective tab 47, 48 exhibits, opposite the lower rectangular fastening portion 56, 57, a rectangular upper portion 58, 59, extending approximately vertically, at its upper end.

Between the respective lower rectangular portion 56, 57 extending approximately vertically and the opposing upper portion 58, 59 extending approximately vertically, an obliquely extending portion 60, 61 has respectively been formed.

Both the respective upper, rectangular portion 58, 59 of the respective tab 47, 48 and a partial portion of the respective obliquely extending portion 60, 61 of the respective tab 47, 48 have been connected via, respectively, a narrow wall portion 62, 63 of the respective side wall 28, 29. By virtue of the narrow wall portion 62, 63 of the respective side wall 28, 29, an L-shaped cross-section of the respective tab 47, 48 in the upper region arises over a certain segment.

The tabs 47, 48, which extend below the M-profile 35, prevent a flexural movement of the reinforcing component 23 about the longitudinal axis of the vehicle, and hence increase the area moment of inertia or the section modulus.

The tabs 47, 48 have been designed in such a way in shape and in their dimensions and arrangements that the tabs 47, 48 are subjected to tensile force as soon as an application of force—for instance, via the traversable barrel 4—impinges on the respective upper portion 58, 59 of the respective tab 47, 48 via the outer door skin 7.

By virtue of the tensile stressing of the tabs 47, 48 in the event of a compressive loading, a shear loading of the fastening of the reinforcing component 23 to the horizontal 42 of the inner door panel 8 is induced, so that distinctly greater loads can be introduced into the inner door panel 8.

On the two approximately horizontal portions 32, 33 of the reinforcing component 23, flat flanges or tabs 64, 65 have been integrally formed on the respective front end face 45, 46 of the horizontal portions 32, 33. The flanges 64, 65 are produced by, for instance, edging in respect of the reinforcing component 23 and serve to improve the introduction of a load via the outer door skin 7 in the loading case. They are arranged at a short spacing of, for instance, 2 mm to 5 mm from the inner surface 24 of the outer door skin 7.

By virtue of the flanges 40, 41 at the lower end 28a, 29a of the respective side wall 28, 29, as a result of the linkage to the inner door panel 8 via the horizontal portion 42 thereof a supporting action arises, and hence a further increase in resistance against a flexural loading of the reinforcing component 23.

Figure 6:
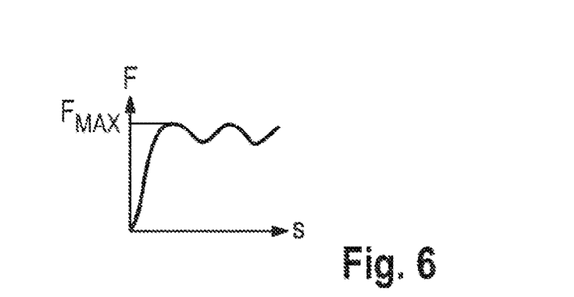
FIG. 6 is a force/distance diagram for a barrier load case in which a steep rise in force occurs up to a maximum force, and an undulatory force progression then follows.

As is evident from FIG. 6, the reinforcing component 23 brings about, for instance in the event of contact with a barrier, a rapid rise in the force-level before the energy acting on the door body 5 in a loading case is reduced to as constant a load-level as possible as a result of deformation.

The constant load-level in the course of the degradation of energy by deformation is controlled by at least one passage opening 66a, 66b and 67a, 67b. The number of passage openings 66a, 66b and 67a, 67b that are present in the given case have been formed on the respective longitudinal edge 30, 31 on the upper portion 28b, 29b of the respective side wall 28, 29, and result in a fold-type buckling when an activation energy is exceeded. An end face 68 of the reinforcing component 23 is located opposite the inner surface 25 of the inner door panel 8.

FIG. 6 shows in an exemplary manner a force/distance diagram for the reinforcing component 23. By virtue of the high flexural rigidity of the reinforcing component 23, a rapid rise in force-level occurs to a certain force $F_{max}$. On the abscissa, which indicates the deformation distance s, an undulatory progression can be discerned which is induced by the specific deformation of the profile. As a result, a load-level that is constant on average is maintained.

The reinforcing component 23 has been fastened to the inner door panel 8 in such a way for optimal absorption of force that the longitudinal axis of the reinforcing component 23 is aligned parallel to the force vector of the introduction of a load in the barrier test—that is to say, as a rule in the transverse direction y of the vehicle.

In one embodiment, a metal sheet with a thickness t which lies within a range of 1 mm≤t≤2 mm and, in particular, amounts to 1.5 mm can be used to produce the reinforcing component 23. The sheet metal may be steel or aluminum, for instance. Through variation of the wall thickness of the metal sheet, the load-level and the weight can be adapted.

In a loading case in the direction of the passenger compartment of the vehicle, an abutment of the inner surface 24 of the outer door skin 7 occurs initially on the flanges 64, 65 of the reinforcing component 23. After this, a deformation of the reinforcing component 23 occurs over a predetermined, permissible distance in the transverse direction y of the vehicle.

What is claimed is:

1. A motor vehicle with a body shell which encloses a passenger compartment of the vehicle, wherein a vehicle door which is capable of swiveling has been arranged in each instance in the body shell in existing door apertures, comprising:

a door body of a respective vehicle door; and a crash reinforcing element fastened on an inner door panel on a lower portion of the inner door panel and extending between an outer door skin and the inner door panel, wherein the crash reinforcing element is an open profile, side walls of which, and an M-profile formed thereon, longitudinally extend in a transverse direction of the vehicle from an inner surface of the inner door panel to an inner surface of the outer door skin for purposes of absorbing forces acting in the transverse direction of the vehicle in a loading case.

2. The motor vehicle according to claim 1, wherein fastening of the crash reinforcing element is effected via respectively opposing flanges which have respectively been formed at a lower end of the respective side wall, angled relative to the side walls.

3. A motor vehicle with a body shell which encloses a passenger compartment of the vehicle, wherein a vehicle door which is capable of swiveling has been arranged in each instance in the body shell in existing door apertures, comprising:

a door body of a respective vehicle door;

a crash reinforcing element arranged on an inner door panel in a lower portion of the door body between an outer door skin and the inner door panel, wherein the crash reinforcing element is an open profile, side walls of which, and an M-profile formed thereon, extend in a transverse direction of the vehicle for purposes of absorbing forces acting in the transverse direction of the vehicle in a loading case, fastening of the crash reinforcing element is effected via respectively opposing flanges which have respectively been formed at a lower end of the respective side wall, angled relative to the side walls, and a further fastening of the crash reinforcing element to the inner door panel is effected via two tabs.

4. The motor vehicle according to claim 3, wherein the two tabs have respectively been integrally formed, in an angled manner in the transverse direction of the vehicle, on the respective side wall.

5. The motor vehicle according to claim 1, wherein the M-profile is constituted by, in each instance, an upper portion of the respective side wall and an adjoining V-shaped profile.

6. The motor vehicle according to claim 5, wherein the respective upper portion of the respective side wall is adjoined respectively by a horizontal portion on which the V-shaped profile has been integrally formed.

7. The motor vehicle according to claim 6, wherein the V-shaped profile has two side walls extending obliquely relative to one another, which have been connected to one another at their opposing lower ends, or in that a horizontal portion has been integrally formed between the opposing lower ends of the side walls.

8. The motor vehicle according to claim 7, wherein a longitudinal edge has respectively been formed between the upper portion of the respective side wall and the V-shaped profile, and the respective longitudinal edge has at least one passage opening.

9. The motor vehicle according to claim 8, wherein a further longitudinal edge which respectively has at least one passage opening has respectively been formed at a respective lower end of the respective side wall and on a respective flange angled relative thereto.

10. The motor vehicle according to claim 9, wherein a recess is formed between the respective side wall and a respective tab.

11. The motor vehicle according to claim 10, wherein the respective tab has been provided with a passage opening.

12. The motor vehicle according to claim 11, wherein a further tab, the surface of which points in the direction of an inner surface of the outer door skin, has respectively been formed on an end face of the M-profile.

13. The motor vehicle according to claim 1, further comprising:

a side-impact beam fastened at opposing ends and to the inner door panel.

14. The motor vehicle according to claim 13, wherein the side-impact beam extends from a rear lower corner of the inner door panel obliquely upward in the vertical direction and forward in the direction of a front end of the motor vehicle as far as a vertical portion of the inner door panel.

* * * * *